United States Patent [19]
Hattori et al.

[11] Patent Number: 4,706,142
[45] Date of Patent: Nov. 10, 1987

[54] MAGNETIC DISK APPARATUS

[75] Inventors: Toshiaki Hattori; Machio Shimanuki, both of Tokyo, Japan

[73] Assignee: Kabushiki Kaisha Toshiba, Japan

[21] Appl. No.: 780,292

[22] Filed: Sep. 26, 1985

[30] Foreign Application Priority Data

Nov. 12, 1984 [JP] Japan ............................ 59-236718

[51] Int. Cl.$^4$ .............................................. G11B 5/54
[52] U.S. Cl. .................................. 360/105; 360/106
[58] Field of Search ............................ 360/105, 97-98, 360/106

[56] References Cited

U.S. PATENT DOCUMENTS 4,417,288 11/1983 Hattori et al. ...................... 360/74.1
4,484,241 11/1984 Brende ............................ 360/137 X
4,562,500 12/1985 Bysdnes ........................... 360/98 X
4,654,735 3/1987 Izraelev ............................ 360/105 X Primary Examiner—A. J. Heinz
Attorney, Agent, or Firm—Finnegan, Henderson, Farabow, Garrett & Dunner

[57] ABSTRACT

A magnetic disk apparatus has a base frame on which a magnetic disk having a head landing zone is carried. A magnetic head is supported by a carriage which is disposed on the base frame to be movable between a stop position where the head is located on the head landing zone of the disk and a position where the head is located on the outer peripheral edge portion of the disk. The carriage is urged by a first urging member to the stop position and is moved by a carriage drive mechanism. A lock member is disposed on the base frame to be movable between an engaged position where the lock member engages the carriage in the stop position to hold it therein and a disengaged position off the path of travel of the carriage. The lock member is urged by a second urging member to the engaged position and is held in the disengaged position by a solenoid when it is energized. After the electric power supplied to the carriage drive mechanism, the solenoid and a disk drive motor for rotating the disk is cut off, the solenoid is energized for a predetermined period by a power supply unit.

9 Claims, 5 Drawing Figures

MAGNETIC DISK APPARATUS

BACKGROUND OF THE INVENTION

The present invention relates to a magnetic disk apparatus, and more specifically to a magnetic disk apparatus provided with a carriage lock mechanism.

Recently, magnetic disk apparatuses provided with a magnetic head of a so-called CSS (contact start-stop) type have been used in which the magnetic head is in contact with a head landing zone of a magnetic disk while the apparatus is nonoperating. In the magnetic disk apparatuses of this type, the magnetic head and magnetic disk are very susceptible to vibration and impact. When the apparatus is nonoperating, therefore, it is necessary to lock the magnetic head, thereby minimizing damage attributed to vibration or impact.

Conventionally, the magnetic head is locked at a predetermined position by manually operating a lock lever when the apparatus' power supply is cut off. According to this method, although the possibility of damage to the magnetic head or magnetic disk may be reduced in some measure, it is necessary to lock or unlock the magnetic head by operating the lock lever each time the apparatus is switched on or off, resulting in a complicated operation.

According to an alternative conventional method, the magnetic head is locked by means of a solenoid.

In general, the magnetic head is fixed on a carriage which is movably disposed on a base frame. The carriage is movable between a stop position where the magnetic head is located on the head landing zone of the magnetic disk and a position remote from the stop position. The carriage is normally urged toward the stop position by a return spring. A driving coil is fixed to the carriage, and a magnet is fixed on the base frame, adjoining the coil. When the driving coil is energized, the carriage is driven in a predetermined direction by the joint action of the magnet.

Meanwhile, the solenoid is fixed on the base frame, and its plunger is connected with a lock lever which is rockably mounted on the base frame. The lock lever is adapted to engage a retaining portion formed on the carriage when the carriage is rocked to the stop position. A lock spring is connected to the lock lever, whereby the lock lever is urged to engage the retaining portion of the carriage.

According to the magnetic disk apparatus constructed in this manner, during operation or while the power is on, the solenoid is energized to attract the plunger, so that the plunger causes the lock lever to move away from the retaining portion of the carriage against the urging force of the lock spring. As a result, the carriage is unlocked. Also, the driving coil is energized, so that the carriage is moved to a desired position against the urging force of the return spring. When the apparatus is switched off after the operation is ended, the solenoid is deenergized, and the carriage is returned to the stop position by the return spring. Thus, the retaining portion of the carriage and the lock lever frictionally engage each other, so that the carriage is locked to the stop position by the lock lever.

In order to securely lock the carriage to the stop position in this apparatus, it is desired that the lock lever is rocked to engage the retaining portion of the carriage after the carriage is fully moved to the stop position. In this apparatus, however, the lock lever and the retaining portion may sometimes engage each other before the carriage reaches the stop position. According to the apparatus of this type, therefore, the urging force of the return spring is made greater than that of the lock spring so that the lock lever can be pushed back by the retaining portion even if the lock lever and the retaining portion engage before the carriage is moved to the stop position. In this case, however, the retaining portion and the lock lever would rub against each other and wear, producing chips. These chips may stick as dust to the magnetic head and magnetic disk, possibly damaging the same. In order to securely hold the carriage in its stop position, moreover, the lock spring should preferably be made stronger. As mentioned before, however, the urging force of the return spring must be greater than that of the lock spring. If the urging force of the return spring is great, a lot of power is needed to drive the carriage. This necessitates the use of a large magnet and a large driving coil, resulting in an increase in the size and manufacturing cost of the apparatus. Also, the action of the carriage is liable to lag.

SUMMARY OF THE INVENTION

The present invention is contrived in consideration of these circumstances, and is intended to provide a magnetic disk apparatus capable of securely holding a magnetic head on a head landing zone of a magnetic disk while the apparatus is nonoperating, without use of any bulky drive system for the magnetic head.

In order to achieve the above object, a magnetic disk apparatus according to the present invention comprises a base frame on which a magnetic disk is to be carried, disk drive means mounted on the base frame for rotating the magnetic disk on the base frame, a magnetic head for recording on, and reproducing information from, the magnetic disk, a carriage supporting the magnetic head and disposed on the base frame so as to be movable between a stop position where the magnetic head is located on a head landing zone of the magnetic disk and a position where the magnetic head is located on the outer peripheral edge portion of the magnetic disk, carriage drive means for driving the carriage, first urging means for urging the carriage toward the stop position thereof, a lock member disposed on the base frame so as to be movable between an engaged position where the lock member engages the carriage in the stop position to hold the same therein and a disengaged position off the path of travel of the carriage, second urging means for urging the lock member toward the engaged position thereof, holding means for, holding the lock member in the disengaged position thereof when holding means is energized, and power supply means for energizing the holding means for a predetermined period after the electric power supplied to the disk drive means, carriage drive means, and holding means is cut off.

BRIEF DESCRIPTION OF THE DRAWINGS

FIGS. 1 to 4 show a magnetic disk apparatus according to one embodiment of the present invention, in which FIG. 1 is a plan view partially in section showing the apparatus, FIG. 2 is a plan view similar to FIG. 1, additionally showing a lock mechanism, FIG. 3 is a circuit diagram of a drive circuit, and FIG. 4 is a plan view illustrating a different operation mode of the apparatus.

DETAILED DESCRIPTION OF THE PREFERRED EMBODIMENTS

Preferred embodiments of the present invention will now be described in detail with reference to the accompanying drawings.

Figure 1:
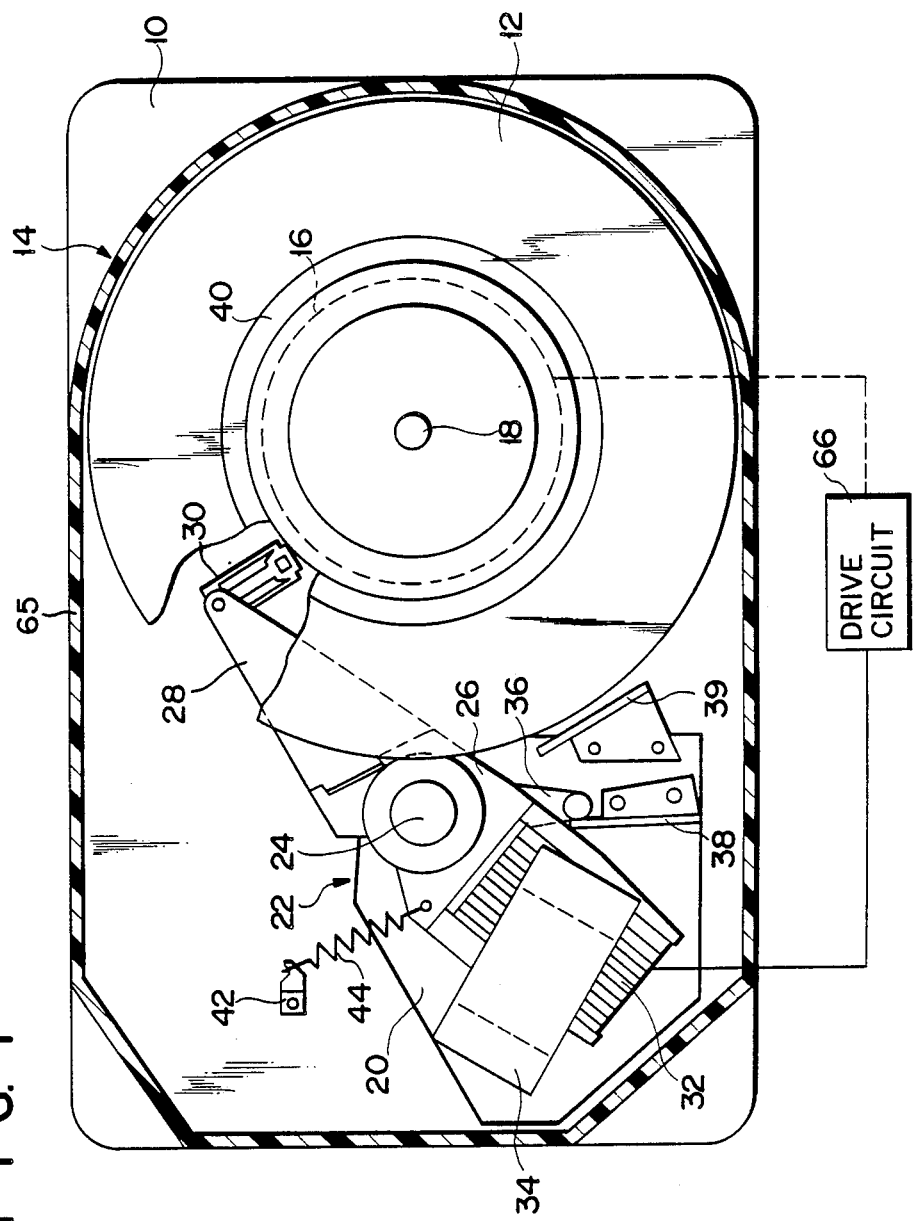

As shown in FIG. 1, a magnetic disk apparatus is provided with a base frame 10 which includes a mounting portion 14 carrying a magnetic disk 12 thereon. A DC motor 16 as disk drive means is fixed on the base frame 10, and the magnetic disk 12 is coaxially fitted on a spindle 18 of the motor 16 for rotation.

A carriage base 20 is fixed on the base frame 10, carrying a carriage 22 thereon. The carriage 22 includes a body 26 mounted on the carriage base 20 so as to be rockable around a pivot 24 and a head arm 28 extending from the body 26. A magnetic head 30 for reading and writing information is fixed to the extended end of the head arm 28, facing the lower surface of the magnetic disk 12. A driving coil 32 is fixed on the carriage body 26, while a magnet 34 is disposed on the carriage base 20 so as to face the driving coil 32. The driving coil 32 and the magnet 34 constitute carriage drive means for rocking the carriage 22 around the pivot 24.

From the carriage body 26 protrudes a stop pin 36 which can engage a pair of stoppers 38 and 39 fixed on the carriage base 20. Thus, the movement of the carriage 22 is restricted between a stop position shown in FIG. 1 in which the stop pin 36 engages the stopper 38 and a position (see FIG. 4) in which the stop pin 36 engages the stopper 39. When the carriage 22 is in the stop position, the magnetic head 30 is located on a head landing zone 40 or the most inner peripheral portion of the magnetic disk 12. When the carriage 22 is in the position where the stop pin 36 engages the stopper 39, the magnetic head 30 is on the outer peripheral portion or the date area of the magnetic disk 12. A compression coil spring 44 as first urging means is stretched between the carriage body 26 and a spring post 42 set up on the base frame 10. Thus, the carriage 22 is urged toward the stop position by the spring 44.

Figure 2:
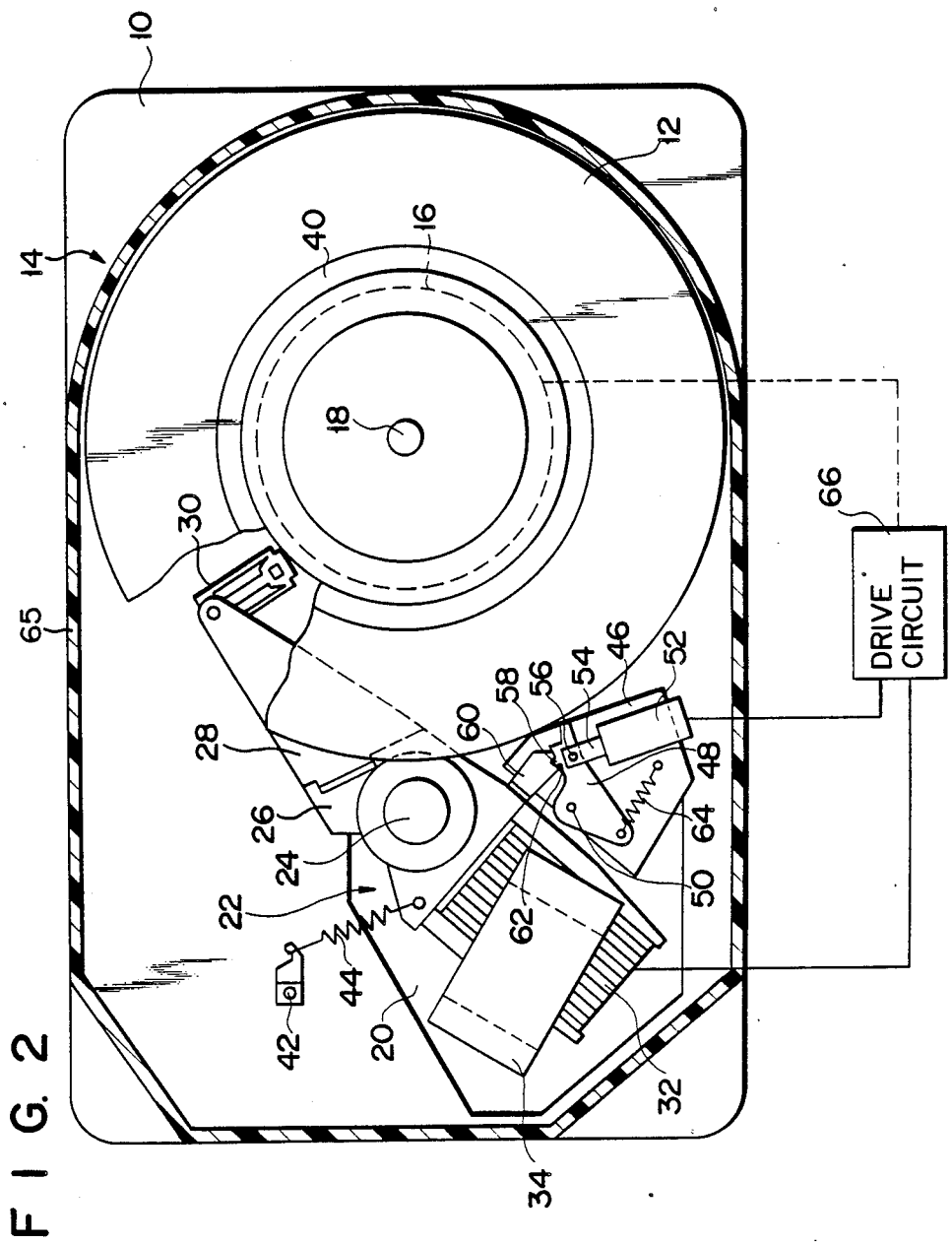

As shown in FIG. 2, a support plate 46 is fixed to the base frame 10 and the carriage base 20, located above the stoppers 38 and 39. A lock arm 48 is mounted on the support plate 46, rockably supported at its central portion by a pivot 50. A solenoid 52 as holding means is fixed on the support plate 46, and a plunger 54 adapted to cooperate with the solenoid 52 is fixed to one end of the lock arm 48 by means of a pin 56. A retaining claw 58 is formed at the one end of the lock arm 48, while an engaging projection 60 with a retaining recess 62 capable of engaging the retaining claw 58 extends from the carrier body 26. The retaining claw 58 is adapted to engage the retaining recess 62 of the engaging projection 60 when the carriage 22 is moved to the stop position. A compression coil spring 64 as second urging means is stretched between the support plate 46 and the other end of the lock arm 48. Thus, the lock arm 48 is urged by the spring 64 toward an engaged position where it engages the engaging projection 60 of the carriage 22. When the solenoid 52 is excited, the lock arm 48 is rocked by the plunger 54, moving to a disengaged position off the path of travel of the carriage 22 or the engaging projection 60 thereof. The magnetic disk 12, carriage 22, solenoid 52 and the like are enclosed by a shroud 65 fixed to the base frame 10.

Figure 3:
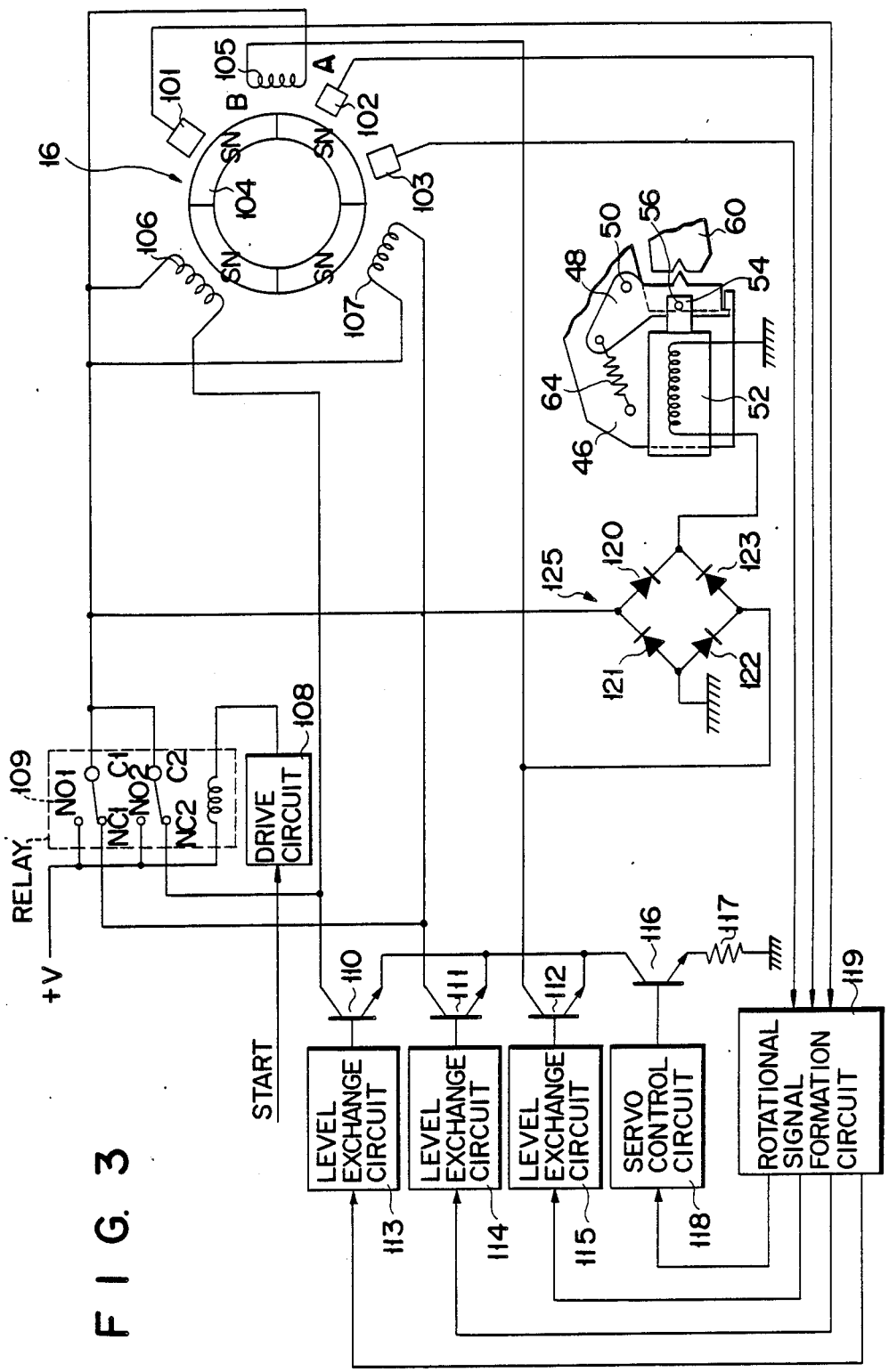

The motor 16, the driving coil 32, and the solenoid 52 are electrically connected to a drive circuit 66 as power supply means. The drive circuit 66 is constructed as shown in FIG. 3.

The DC motor 16 includes a rotor having a ring-shaped magnet 104 and a stator having three-pole coils 105, 106 and 107 arranged outside the rotor. The coils 106 and 107 are designed to produce electromotive forces of different phases. Three Hall elements 101, 102 and 103 are arranged outside the rotor, whereby the rotational position of the rotor is detected in accordance with the change of magnetic fluxes which are linked as the rotor rotates. In response to a start signal (designated by START in FIG. 3) externally provided for the rotation of the magnetic disk 12, the output of a motor drive circuit 108 goes low. Thus, the drive circuit 108 delivers a drive signal to energize a relay 109. When the relay 109 is energized, drive current from a power source +V actuates the DC motor 16. The relay 109 includes a pair of contacts NO1 and NO2 supplied with current from the power source +V, a pair of contacts NC1 and NC2 connected to the collectors of transistors 111 and 110, respectively, and a pair of contacts C1 and C2 adapted to be alternatively connected to the contacts NO1 and NO2 or the contacts NC1 and NC2 in accordance with drive signal control. In the state shown in FIG. 3, the output level of the motor drive circuit 108 is high.

The bases of the transistors 110, 111 and 112 are connected to level changing circuits 113, 114 and 115, respectively. The emitters of the transistors 110, 111 and 112 are connected to the collector of a transistor 116. The emitter of the transistor 116 is grounded through a resistor 117, and its base is connected to a servocontrol circuit 118. A rotation signal generating circuit 119 serves to deliver signals to the level changing circuits 113, 114 and 115 and the servocontrol circuit 118 in accordance with detection signals for the rotational position of the rotor 104 of the motor 16 detected by the Hall elements 101, 102 and 103. Diodes 120, 121, 122 and 123 form a bridge rectifier circuit 125. The node between the diodes 121 and 122 is grounded, while the node between the diodes 120 and 121 is connected to the contacts C1 and C2 of the relay 109 and one end of each of the coils 105, 106 and 107 of the motor 16. The other ends of the coils 105, 106 and 107 are connected to the collectors of the transistors 112, 110 and 111, respectively. The node between the diodes 120 and 123 is connected to the DC solenoid 52, while the node between the diodes 122 and 123 is connected to the collector of the transistor 112. When the magnetic disk apparatus is nonoperating, the relay 109 constitutes short-circuiting means for connecting those two coils 106 and 107 which produce electromotive forces of different phases, out of the three coils 105, 106 and 107 of the motor 16.

The operation of the magnetic disk apparatus constructed in this manner will now be described.

FIGS. 1 and 2 show the nonoperating state of the magnetic disk apparatus. In this state, the retaining recess 62 of the engaging projection 60 of the carriage 22 and the retaining claw 58 of the lock arm 48 are in engagement with each other, and the lock arm 48 is pressed against the engaging projection 60 by the spring 64. As a result, the carriage 22 is held in the stop position shown in FIGS. 1 and 2, and is prevented from being rotated by vibration or impact. In this state, moreover, the magnetic head 30 is located on the head landing zone 40 of the magnetic disk 12.

Figure 4:
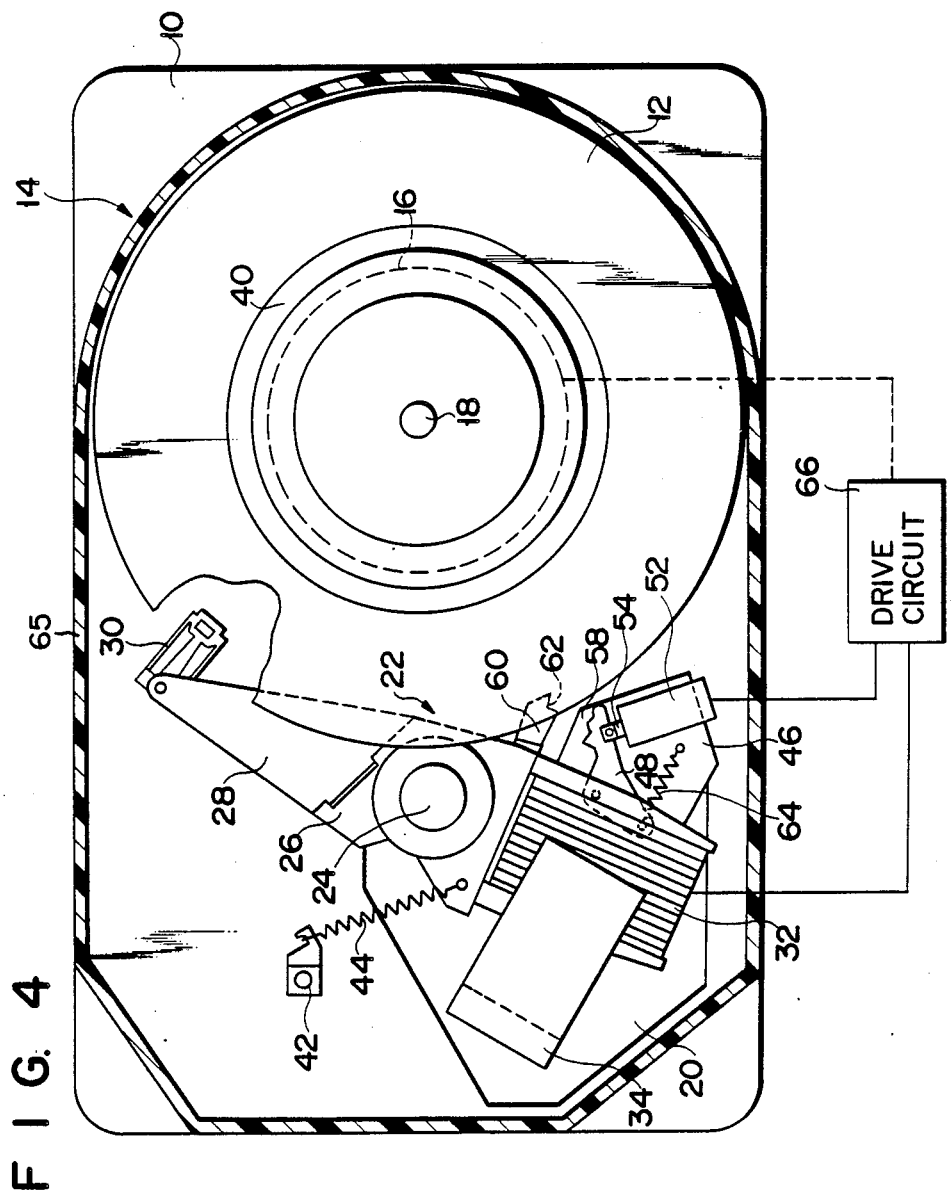

When the start signal is applied to the input of the drive circuit 66 to cause the output of the motor drive circuit 108 to go low, the contacts NO1 and NO2 of the relay 109 are connected to the contacts C1 and C2 thereof, respectively. As a result, current from the power source +V is supplied to the diode 120 through the relay 109, so that the solenoid 52 is energized. Thereupon, the plunger 54 is swallowed into the solenoid 52, and the lock arm 48 coupled to the plunger 54 is rocked clockwise around the pivot 50 against the urging force of the spring 64, thereby moving to the disengaged position. The retaining claw 58 of the lock member 48 separates from the retaining recess 62 of the engaging projection 60, thereby releasing the carriage 22 from the locked state. Thus, the carriage 22 is allowed to rock around the pivot 24, and the magnetic head 30 to move to any position on the magnetic disk 12. This state is shown in FIG. 4.

The current from the power source +V supplied through the relay 109 is applied at the same time to the coils 105, 106 and 107. In accordance with detection signals from the Hall elements 101, 102 and 103, the rotation signal generating circuit 119 supplies the level changing circuits 113, 114 and 115 with timing signals for energizing the coils 105, 106 and 107. At the same time, the rotation signal generating circuit 119 supplies the servocontrol circuit 118 with rotation signals. If the rotating speed of the DC motor 16 is not higher than a predetermined rate, the servocontrol circuit 118 applies a high voltage to the transistor 116, thereby turning on the same. Thereupon, the level changing circuits 113, 114 and 115 apply voltages to the transistors 110, 111 and 112, respectively, to turn on the same, so that current flows through the coils 105, 106 and 107 to rotate the motor 16. In this case, the transistors 110, 111 and 112 are not simultaneously turned on, but are sequentially controlled by energization timing signals from the rotation signal generating circuit 119. When the motor 16 starts to rotate, the Hall elements 101, 102 and 103 deliver the rotational position detection signals for the rotor 104 to the signal generating circuit 119. In response to the rotational position detection signals, the circuit 119 supplies predetermined signals to the level changing circuits 113, 114 and 115 and the servocontrol circuit 118. When the start signal goes high so that the power supply is cut off or a power switch (not shown) is turned off, the contacts NC1 and NC2 of the relay 109 are connected to the contacts C1 and C2, respectively, as shown in FIG. 3. As a result, the coils 106 and 107 are short-circuited by the relay 109 and produce electromotive forces of different phases. This short-circuiting causes a self-current flow for regenerative braking. At the same time, induced electromotive force is produced in the coil 105, and its potential is applied to the nodes between the diodes 122 and 123 and between the diodes 120 and 121. If ends A and B of the coil 105 are positive and negative, respectively, the current flows from end A to end B through the diode 120, solenoid 52, ground, and diode 122. Thus, if the power source +V is turned off, the current flows through the solenoid 52 until the rotation of the motor 16 is attenuated to a predetermined level. In the meantime, the lock arm 48 is held in its disengaged position by the plunger 54. The moment the power source +V is turned off, the carriage 22 is rocked clockwise around the pivot 24 by the spring 44 to reach the stop position where the stop pin 36 engages the stopper 38. Since regenerative braking is accomplished by the coils 106 and 107, the rotating speed of the motor 16 is gradually lowered. When the rotating speed of the motor 16 is reduced to a predetermined level, the induced electromotive force produced in the coil 105 is reduced correspondingly, so that the plunger 54 is disabled from retaining the lock arm 48 against the urging force of the spring 64. Accordingly the lock arm 48 is rocked by the spring 64 to reach the engaged position. By this time, the carriage 22 is already moved to the stop position, so that the retaining claw 58 of the lock arm 48 engages the retaining recess 62 of the engaging projection 60, causing the lock arm 48 to be kept as it is. Thus, the carriage 22 is restricted in its rocking motion by the lock arm 48 and locked to the stop position.

According to the magnetic disk apparatus constructed in this manner, the lock arm 48 is moved to the engaged position by the agency of the drive circuit 66 to engage the carriage 22 after the carriage 22 is moved to the stop position. Therefore, the carriage 22 can securely be held in the stop position without engaging the lock arm 48 before reaching the stop position and without producing any chips due to abrasion between the engaging projection 60 and the retaining claw 58. Moreover, the spring 44 for returning the carriage 22 need not be so strong, requiring no increase in size of the driving coil 32 and the magnet 34, and the movement of the carriage 22 or the magnetic head 30 can be speeded up. Also, the spring 64 for urging the lock arm 48 can be made stronger, so that the carriage 22 can more securely be held in the stop position. Thus, the carriage 22 and the magnetic head 30 can securely be prevented from being moved by vibration or impact, reducing the possibility of the magnetic head 30 and the magnetic disk 12 being damaged. After the power supply is cut off, the solenoid 52 is excited by using the induced electromotive force produced by the motor 16, so that it is unnecessary to provide any other special power source.

It is to be understood that the present invention is not limited to the embodiment described above, and that various changes and modifications may be effected therein by one skilled in the art without departing from the scope or spirit of the invention.

Figure 5:
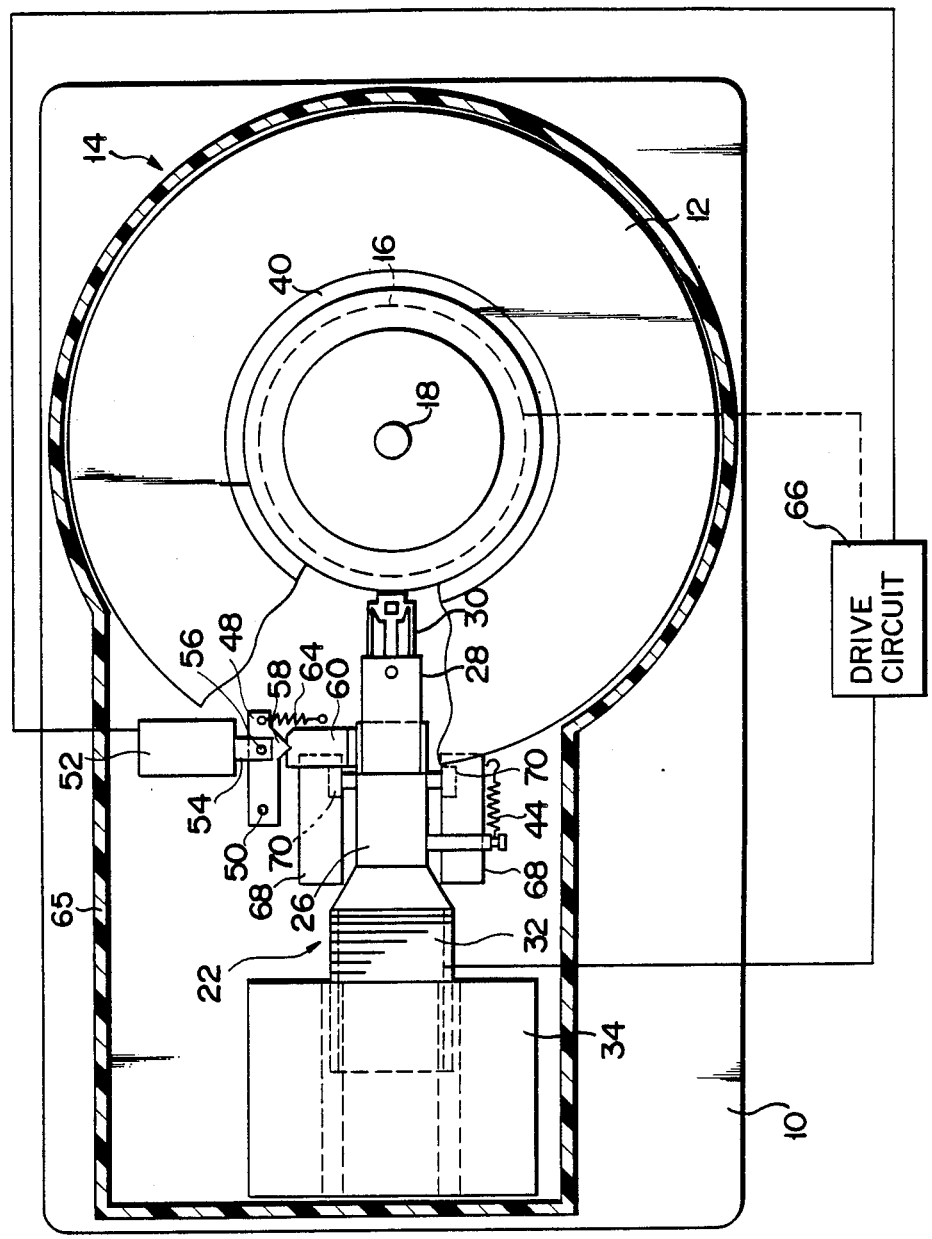
FIG. 5 is a plan view partially in section showing a magnetic disk apparatus according to another embodiment of the invention.

In the above embodiment, for example, the carriage is of a rocking type. As shown in FIG. 5, however, the carriage may alternatively be of a linear type. According to this second embodiment, a body 26 of a carriage 22 is supported on a pair of parallel guide rails 68 on a base frame 10 by means of bearings 70. The carriage body 26 is linearly movable along the guide rails 68 between a stop position shown in FIG. 5 and a position where a magnetic head 30 is located on the outer peripheral edge portion of a magnetic disk 12. An engaging projection 60 extending from the carriage body 26 is adapted to engage a retaining claw 58 of a lock arm 48 rockably mounted on the base frame 10 when the carriage 22 is in the stop position. As regards the arrangement of other components, the second embodiment is the same as the first embodiment described above. In FIG. 5, therefore, like reference numerals are used to designate like portions as included in the first embodiment.

Constructed in this manner, the second embodiment may provide the same function and effect of the first embodiment.

In the embodiments described above, the solenoid is excited by the use of the induced electromotive force produced by the motor after the power supply is cut off. Alternatively, however, the solenoid may be excited by means of a capacitor. Moreover, the coils of the motor are not limited to three in number, and may be increased as required.

What is claimed is:

1. A magnetic disk apparatus for recording on and reproducing information from a magnetic disk having a head landing zone, comprising:
   a base frame on which a magnetic disk is to be carried;
   electric disk drive means mounted on the base frame for rotating the magnetic disk on the base frame;
   a magnetic head for recording on and reproducing information from the magnetic disk;
   a carriage supporting the magnetic head and disposed on the base frame so as to be movable between a stop position where the magnetic head is located on the head landing zone of the magnetic disk and a position where the magnetic head is located on the outer peripheral edge portion of the magnetic disk;
   carriage drive means for driving the carriage;
   first urging means for urging the carriage to the stop position thereof;
   a lock member disposed on the base frame so as to be movable between an engaged position where the lock member engages the carriage in the stop position to hold the same therein and a disengaged position off the path of travel of the carriage;
   second urging means for urging the lock member toward the engaged position thereof;
   holding means for holding the lock member in the disengaged position thereof when electrically energized; and
   power supply means for energizing the holding means for a predetermined period after the electric power supplied to the disk drive means, carriage drive means and holding means is cut off.

2. The magnetic disk apparatus according to claim 1, wherein said disk drive means includes a DC motor having a rotor formed of a magnet and a stator including at least three coils, and said power supply means includes a rectifier circuit for supplying the holding means with electromotive force induced in the at least one of the coils of the rotor when the electric power is cut off.

3. The magnetic disk apparatus according to claim 2, wherein said power supply means includes a plurality of Hall elements for detecting the rotational phase of the rotor and delivering detection signals, a rotation signal generating circuit for generating rotation signals in response to the detection signals from the Hall elements, a plurality of level changing circuits for delivering timing signals to the coils of the motor in response to the signals from the rotation signal generating circuit, thereby changing the coil, and a servocontrol circuit for controlling the rotating speed of the rotor in accordance with the signals from the rotation signal generating circuit.

4. The magnetic disk apparatus according to claim 1, wherein said carriage is rockable between the stop position and the position where the magnetic head is located on the outer peripheral edge portion of the magnetic disk.

5. The magnetic disk apparatus according to claim 1, wherein said carriage is linearly movable between the stop position and the position where the magnetic head is located on the outer peripheral edge portion of the magnetic disk.

6. The magnetic disk apparatus according to claim 1, wherein said carriage includes an engaging projection having a retaining recess, and said lock member is rockable between the engaged position and the disengaged position and includes a retaining portion capable of engaging the retaining recess in the engaged position.

7. The magnetic disk apparatus according to claim 1, wherein said carriage drive means includes a driving coil mounted on the carriage and connected to the power supply means and a magnet fixed on the base frame so as to face the driving coil.

8. The magnetic disk apparatus according to claim 1, further comprising retaining means for restricting the movement of the carriage between the stop position and the position where the magnetic head is located on the outer peripheral edge portion of the magnetic disk, said retaining means including a stop member protruding from the carriage, a first stopper fixed on the base frame and adapted to engage the stop member when the carriage is moved to the stop position, and a second stopper fixed on the base frame and adapted to engage the stop member when the carriage is moved to the position where the magnetic head is located on the outer peripheral edge portion of the magnetic disk.

9. The magnetic disk apparatus according to claim 1, wherein said holding means includes a plunger connected to the lock member and a solenoid for urging the plunger.

* * * * *